United States Patent [19]

Nomura et al.

[11] Patent Number: 4,681,373
[45] Date of Patent: Jul. 21, 1987

[54] WHEEL SLIP CONTROL SYSTEM

[75] Inventors: Yoshihisa Nomura; Masakazu Ishikawa, both of Toyota; Akira Shirai, Toyoake; Takahiro Nogami, Toyota; Kazumasa Nakamura; Kaoru Ohashi, both of Okazaki, all of Japan

[73] Assignee: Toyota Jidosha Kabushiki Kaisha, Aichi, Japan

[21] Appl. No.: 775,005

[22] Filed: Sep. 11, 1985

[30] Foreign Application Priority Data

Sep. 21, 1984 [JP] Japan ............................. 59-199216
May 8, 1985 [JP] Japan ............................. 60-68438[U]

[51] Int. Cl.⁴ .............................................. B60T 8/08
[52] U.S. Cl. .................................... 303/106; 303/96; 303/116; 303/119
[58] Field of Search ................. 303/96, 100, 105, 106, 303/110, 111, 113, 115, 116, 119, DIG. 4, 84 A; 188/181 A, 181 C, 181 R; 180/197; 364/426

[56] References Cited

U.S. PATENT DOCUMENTS

| | | | |
|---|---|---|---|
| 3,503,655 | 3/1970 | Heimler | 303/84 A |
| 3,520,576 | 7/1970 | Okamoto et al. | 188/181 A |
| 3,582,152 | 6/1971 | Burckhardt | 188/181 A |
| 3,666,328 | 5/1972 | Williams | 303/115 |
| 3,779,331 | 12/1973 | Burckhardt et al. | 180/197 |
| 3,963,277 | 6/1976 | Chiba | 303/113 |
| 3,993,364 | 11/1976 | Chiba et al. | 188/181 A |
| 4,509,802 | 4/1985 | Solleder et al. | 180/197 |
| 4,554,990 | 11/1985 | Kamiya et al. | 180/197 |

Primary Examiner—John W. Caldwell, Sr.
Assistant Examiner—Alvin Oberley
Attorney, Agent, or Firm—Parkhurst & Oliff

[57] ABSTRACT

A wheel slip control system used for a vehicle includes a pressure source selector which selects one of the first pressure source providing a first pressure and a second pressure source providing a second pressure depending on the difference of the two pressures, a slip controller which adjusts the first pressure in response to a first adjustment signal or adjusts the second pressures in response to a second adjustment signal and thereafter operates to suppress slipping of the wheels including the driven wheels, a brake slip detector which produces a brake slip signal upon detection of a slip during braking operation, an acceleration slip detector which produces an acceleration slip signal upon detection of a slip during accelerating operation, and an electronic controller which provides the first adjustment signal to the slip controller based on the brake slip signal for the purpose of vehicle anti-skid control and provides the second adjustment signal to the slip controller based on the acceleration slip signal for the purpose of vehicle traction control. The wheel slip control system performs both of anti-skid control and traction control for a vehicle with a simple arrangement.

9 Claims, 11 Drawing Figures

WHEEL SLIP CONTROL SYSTEM

BACKGROUND OF THE INVENTION

1. Technological Field

The present invention relates to a wheel slip control system for a vehicle operable to control the frictional force between the driven wheel tire and the road surface during a braking operation and during an accelerating operation as well, and particularly to a wheel slip control system which controls the rotation of the driven wheel using a brake hydraulic system.

2. Related Art

There have been known so-called anti-skid brake systems for vehicles which control the rotation of the wheel so that an optimal braking force is produced without the occurrence of "locked wheel" during the braking operation. In these systems, the rotational speed of the wheel (termed "wheel speed" hereinafter) is controlled to amount to slightly lower than the running speed of the vehicle (termed "vehicle speed" hereinafter) during the braking operation so as to maximize the frictional force between the wheel tire and the road surface.

Defining a slip rate S as a function of the vehicle speed Vs and the wheel speed V as:

$$S = [(Vs - V)/Vs] \times 100(\%)$$

the frictional force M between the wheel tire and the road surface reaches a maximum, and at the same time the side force F for preventing a skid has a proper value, when the slip rate S is around 10%. Based on this fact, the wheel speed V is controlled to a speed calculated by the following equation so that the slip rate S becomes around 10%, for example:

$$V = (1 - \alpha)Vs - \beta$$

where $\alpha$ is a constant taking a value, e.g., 0.03, and $\beta$ is a constant taking a value, e.g., 4 km/hour.

Various anti-slip and anti-skid wheel control systems have been developed and practically installed on vehicles for the security purpose of minimizing the stopping distance without a skid when the driver takes an abrupt braking action, whereas the development of a traction control brake system for providing an optimal vehicle accelerating performance is still inert with some attempts being made to reduce the engine output power upon detection of a wheel slip during the accelerating operation.

The conventional traction control brake system controls the output of the internal combustion engine through the control of the ignition timing or air-fuel mixing ratio, and such an operating scheme can cause an abnormal vibration and impaired exhaust emission control due to abrupt changes in the operating condition of the engine. Moreover, reduction of the engine output torque has a time lag against a change in the ignition timing or air-fuel ratio, and therefore a high response acceleration control cannot be achieved.

SUMMARY OF THE INVENTION

It is an object of the present invention to solve the foregoing problems and easily provide a wheel slip control system capable of controlling the frictional force between the driven wheel tire and the road surface accurately and responsively upon detection of a wheel slip condition during the vehicle accelerating operation.

Another object of this invention is to provide a wheel slip control system which uses a slip control means, e.g., anti-skid control means, and an additional pressure source already installed on the vehicle to control the braking force of wheels including the driven wheels so that an excessive slip, such as idle running of driven wheel and accompanying skid, is prevented, whereby the driven wheels produce an optimal traction force.

Still another object of this invention is to provide a wheel slip control system requiring minimal traction control devices and having a simple arrangement for the overall wheel slip control.

A further object of this invention is to provide a wheel slip control system which readily provides traction control ability for a vehicle upon installing an anti-skid control system and an additional pressure source.

Figure 1:
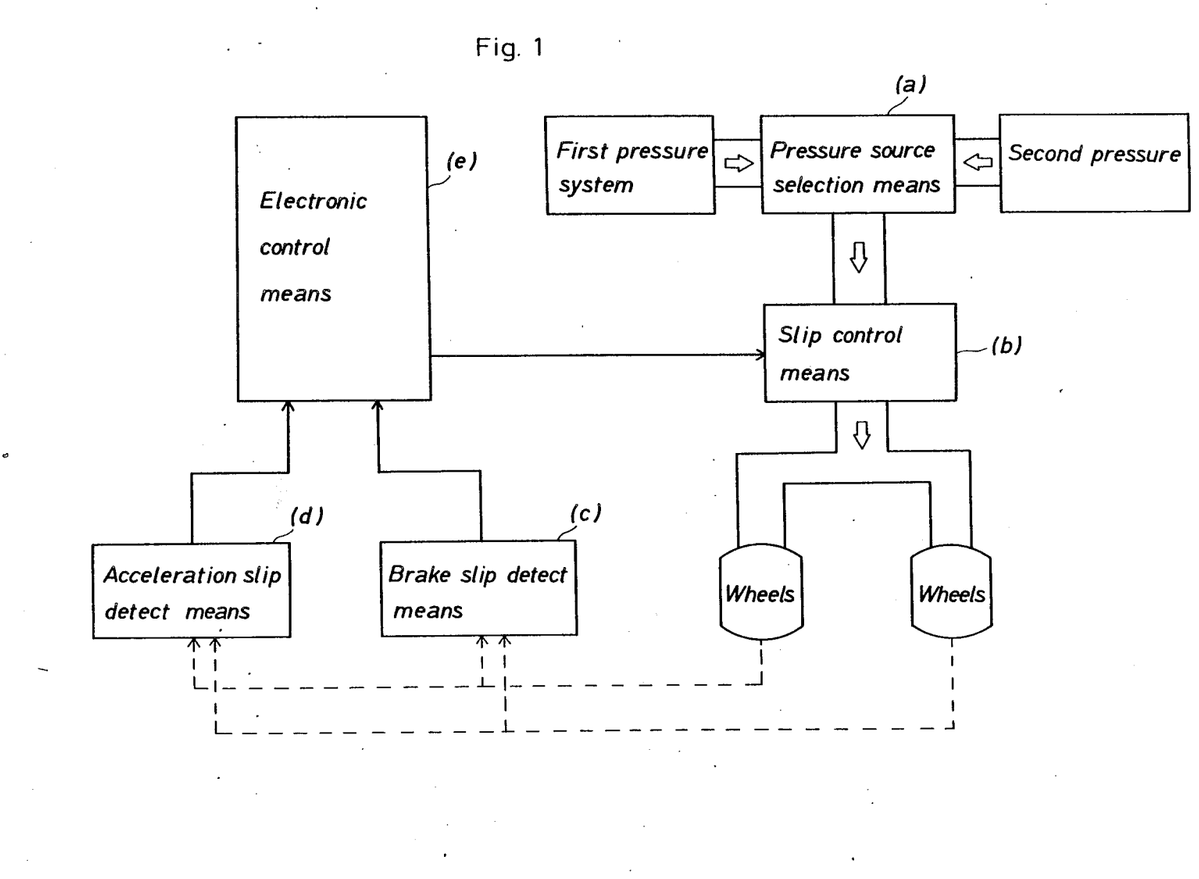
FIG. 1 is a general block diagram according to the invention slip control system.

In order to achieve the above objectives thereby to solve the aforementioned problems, the inventive wheel slip control system features include (as shown in FIG. 1):

(a) a pressure source selection means which is sensitive to the pressure of a first pressure system and the pressure of a second pressure system to evaluate the difference of the two, and is adapted to apply selectively the pressure of the first or second pressure systems depending on the differential pressure therebetween;

(b) a slip control means which receives a first adjusting signal to adjust the pressure of the first source provided by the above selection means, or receives a second adjusting signal to adjust the pressure of the second source provided by the selection means, and thereafter operates to suppress slipping of wheels including the driven wheels;

(c) a brake slip detection means which detects a wheel slip during a braking operation of the vehicle and produces a brake slip signal representing the slip;

(d) an acceleration slip detection means which detects a wheel slip during an accelerating operation of the vehicle and produces an acceleration slip signal representing the slip; and (e) an electronic control means which receives the brake slip signal and provides the slip control means with the first adjusting signal for anti-skid control based on the brake slip signal so that the driven wheel speed is within a prescribed first range, and receives the acceleration slip signal and provides the slip control means with the second adjusting signal for traction control based on the acceleration slip signal so that the driven wheel speed is within a prescribed second range.

The inventive wheel slip control system arranged as described above operates to switch the first pressure system operated by the driver to the second pressure system upon detection of a slip on a driven wheel during the vehicle acceleration, and to control the braking force applied by the switched pressure system to wheels including the driven wheels by a slip control means, e.g., anti-skid control means, in accordance with the state of acceleration slip. The first pressure system is a pressure source providing a pressure directly in response to the operation of the brake pedal or indirectly through a mechanical amplification thereof as in a power brake system etc. The second pressure system is an arbitrary pressure source installed on the vehicle, such as that used in the anti-skid braking or power steering system. The pressure source selection means is to select one of the sources having a higher pressure, and it can be arranged by combining check valves or using a shuttle valve. The pressure selection means may be arranged to switch the pressure source forcedly in response to the state of slip control of the vehicle.

The anti-skid control means is a known device which controls to increase, hold or decrease the pressure of the braking hydraulic system by means of a 3-port 3-position valve or the like, and it operates to detect a wheel slip in the braking operation and control the wheel operation so as to produce a maximum possible braking force without causing a "locked wheel" or skid.

The brake slip detection means operates to detect a wheel slip state during the braking operation of the vehicle, and it detects the occurrence of a slip when the difference between the vehicle speed and the wheel speed exceeds a certain value, or the acceleration of the wheel rotation falls below a negative value.

The acceleration slip detection means operates to detect a slip of the driven wheel during an accelerating operation, and it detects the occurrence of a slip when the difference between the driven wheel speed and the vehicle speed exceeds a certain value, or when the difference between the driven wheel speed and the non-driven wheel speed exceeds a certain value, or it detects the occurrence of idle racing when the acceleration of the rotation of the driven wheel exceeds a certain value.

The brake slip detection means and the acceleration slip detection means may be combined in a single device alternatively operating under parameter setups for the respective purposes. Brake slip and acceleration slip do not occur at one time, and a common device for dealing with these events is advantageous for the simplification of the device and structure.

DESCRIPTION OF THE PREFERRED EMBODIMENTS

Embodiments of the present invention will now be described with reference to the drawings.

Figure 2:
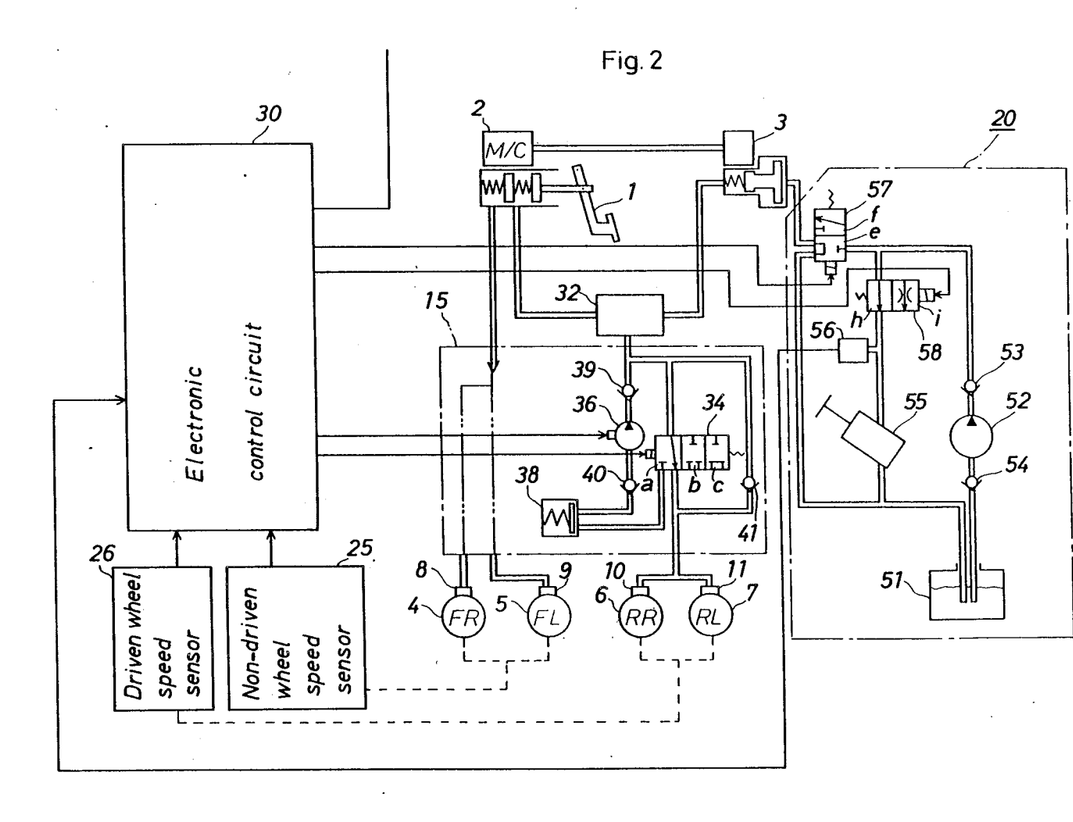
FIG. 2 is a schematic block diagram mainly showing the hydraulic system of the wheel slip control system embodying the present invention.

In FIG. 2 showing generally an embodiment of the inventive wheel slip control system, the arrangement includes a brake pedal 1, a brake master cylinder 2 serving as the first pressure source for providing a brake hydraulic pressure in response to a displacement of the brake pedal 1, a sub-master cylinder 3 serving as the second pressure source for providing a brake hydraulic pressure derived from the power steering hydraulic system upon detection of an acceleration slip as described later, non-driven right and left wheels 4 and 5 of the vehicle, driven right and left wheels 6 and 7, wheel cylinders 8–11 provided for the wheels 4–7, a hydraulic system 15 used for anti-skid control, a power steering hydraulic system 20 of the vehicle, a non-driven wheel speed sensor 25 generating a pulse signal at frequencies in proportion to the rotational speed of the non-driven wheels 4 and 5, a driven-wheel speed sensor 26 generating a pulse signal at frequencies in proportion to the rotational speed of the driven wheels 6 and 7, and an electronic control circuit 30 implementing anti-skid control and traction control as well.

The brake master cylinder 2 is of a tandem master cylinder assembly, supplying a brake oil pressure to the wheel cylinders 8 and 9 on the non-driven wheels 4 and 5 in one hydraulic system, and to the wheel cylinders 10 and 11 of the driven-wheels 6 and 7 in another. The brake oil pressure produced by the submaster cylinder 3 is used for the braking of driven wheels 6 and 7, and as to which of this brake hydraulic pressure or that produced by the brake master cylinder 2 is supplied by way of the anti-skid hydraulic system 15 to the wheel cylinders 10 and 11 is determined by a change valve 32 serving as the pressure source selection means. The change valve 32 has the structure of a shuttle valve, supplying the higher of the above two hydraulic pressures to the anti-skid hydraulic system 15.

The anti-skid hydraulic system 15 has major hydraulic paths for supplying the pressure from the change valve 32 to the wheel cylinders 10 and 11 via a 3-position valve 34, and operates to increase the pressure by means of an oil pump 36 and hold or decrease (release the pressure to a reservoir 38) depending on the position of the 3-position valve 34. The system 15 further includes check valves 39, 40 and 41, the hydraulic path via the valve 41 being used to decrease the pressure (decrease the braking force) by the operation of the brake pedal when the 3-position valve 34 is set at "hold" position. The 3-position valve 34 is operated by the electronic control circuit 30, and positions a, b and c in FIG. 2 correspond to "increase pressure", "hold pressure" and "decrease pressure", respectively.

Next, the power steering hydraulic system 20 will be described. The power steering hydraulic system 20 consists of an oil pump 52 for pumping up the hydraulic oil used in the system from a reservoir tank 51, check valves 53 and 54 for conducting the oil flow in one direction, a steering gear box 55, an oil pressure switch 56 which turns on (low level) when the oil pressure in the steering gear box 55 increases due to steering operation, a 2-position valve 57 (termed "M/C up-pressure valve" hereinafter) having e position for supplying the oil pressure increased by the oil pump 52 (termed "steering oil pressure" hereinafter) only to the power steering hydraulic system 20 and position f for supplying the oil to both the system 20 and the traction control sub-master cylinder 3, and 2-position valve 58 (termed "PS up-pressure valve" hereinafter) having position h for supplying the hydraulic oil pumped by the oil pump 52 directly to the steering gear box 55 and position i for supplying the hydraulic oil with increased pressure to the gear box 55. The position of the oil pressure switch 56 is communicated to the electronic control circuit 30, and the M/C up-pressure valve 57 and PS up-pressure valve 58 are controlled by the electronic control circuit 30.

Figure 3:
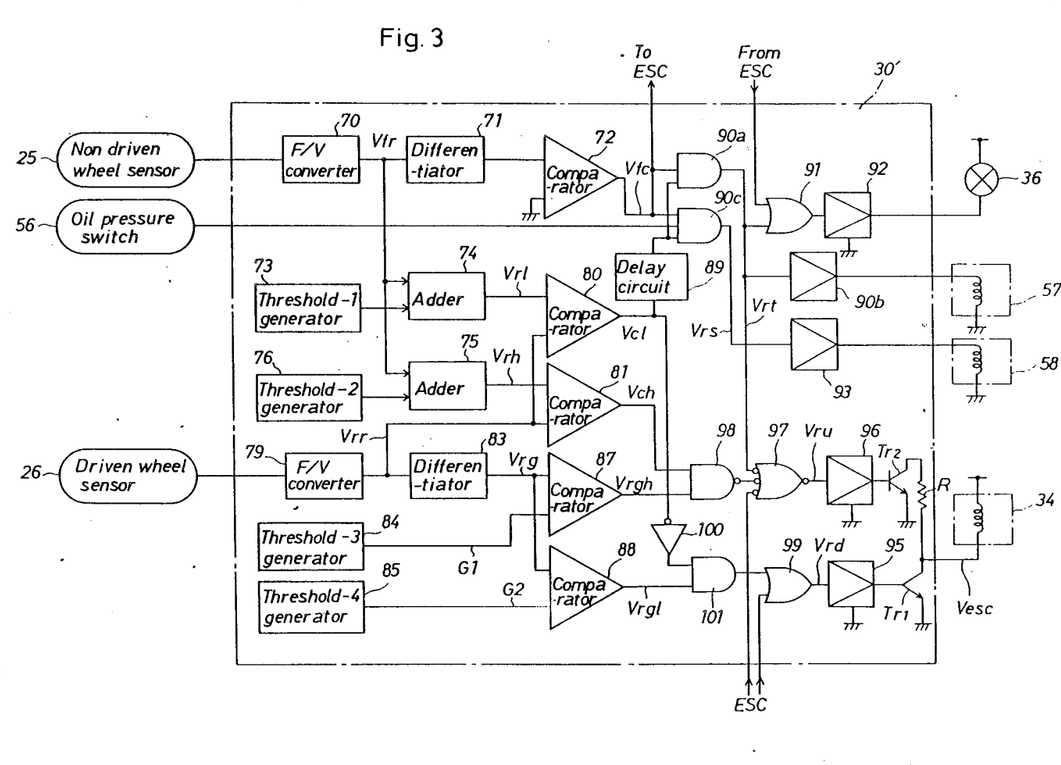
FIG. 3 is a schematic block diagram showing the traction control section 30' of the electronic control circuit 30 in FIG. 2 according to the first embodiment.

Next, a section 30' of the electronic control circuit 30 for implementing traction control will be described with reference to FIG. 3. Besides the traction control circuit 30', the electronic control circuit 30 includes the anti-skid control circuit (ESC), but this section is unrelated directly to the present invention and will be disregarded in the following description.

Briefly, the traction control circuit 30' operates to receive the pulse signal from the non-driven wheel speed sensor 25 on an F/V converter 70, differentiate its voltage output Vfr by a differentiator 71 to obtain the acceleration of the vehicle, and compare the differentiated output with a zero level by a comparator 72 to obtain a signal Vfc indicative of whether the vehicle is in acceleration or deceleration. The signal Vfc is sent to the anti-skid control circuit ESC, which is activated when Vfc is at a low level.

Figure 4:
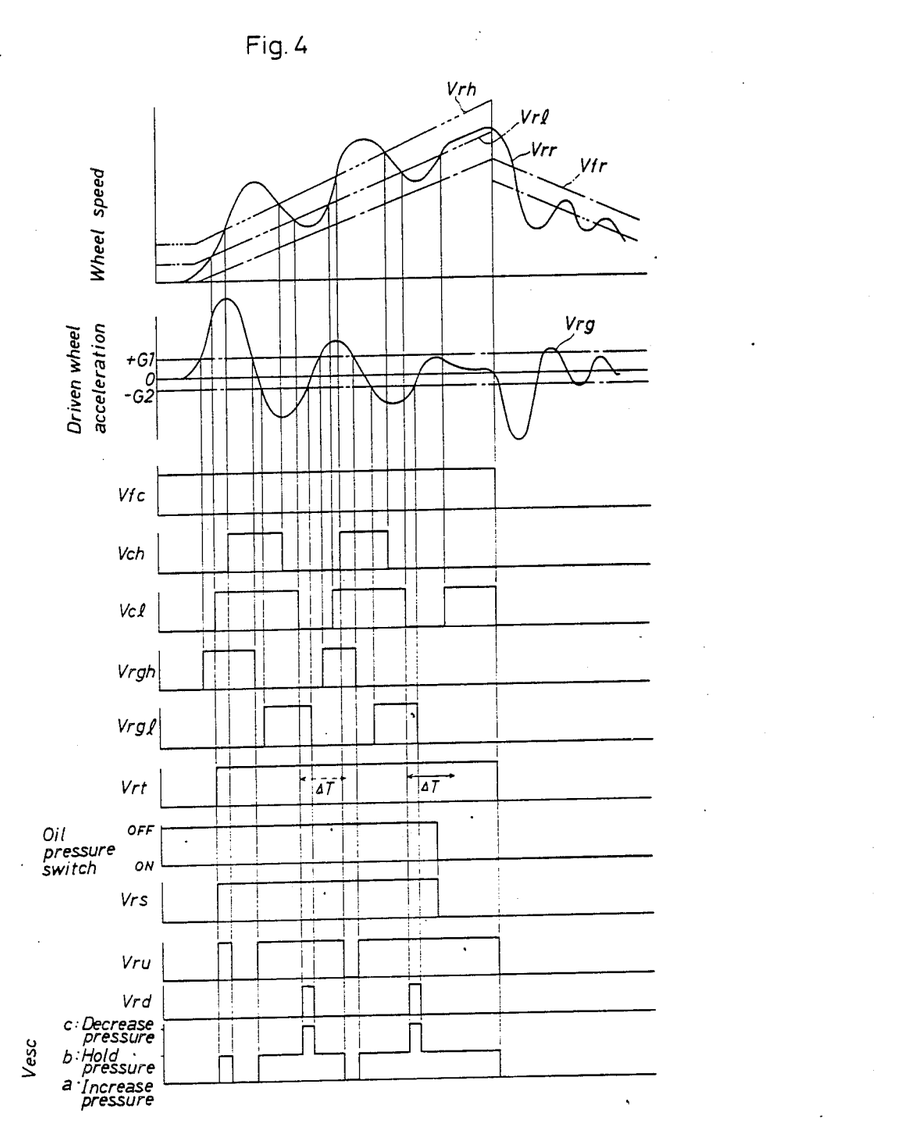
FIG. 4 is a timing chart showing, as an example, the control operation of the first embodiment.

Based on the signal Vfr representing the non-driven wheel speed, a threshold-1 generator 73 and an adder 74 in unison produce the first slip threshold level Vrl, and a threshold-2 generator 76 and an adder 75 in unison produce the second slip threshold level Vrh. These voltage levels are compared by comparators 80 and 81, respectively, with the voltage signal Vrr which is derived from the pulse signal generated by the driven wheel sensor 26 and converted into voltage by an F/V converter 79, and two slip threshold signals Vcl and Vch are obtained. These signals indicate comparison of the driven wheel speed (Vrr) with the lower threshold level Vrl and upper threshold level Vrh provided based on the non-driven wheel speed (Vfr) as shown at the top of FIG. 4. The lower slip threshold signal Vcl gives a timing for the preparation of traction control, while the upper slip threshold signal Vch gives a timing for carrying out traction control by increasing the brake oil pressure.

The traction control circuit 30' further operates to differentiate (at differentiation 83) the signal Vrr representing the driven wheel speed to obtain a signal Vrg representing the accelerating of the driven wheels 6 and 7. The signal Vrg is compared with an output signal G1 from a threshold-3 generator 84 and an output signal G2 from a threshold-4 generator 85 by comparators 87 and 88, respectively, and the first slip control signal Vrgh and second slip control signal Vrgl are obtained.

The above three signal processing systems perform traction control as shown in FIG. 4.

In operation, when the vehicle accelerates to have a high Vfc signal, a lower slip threshold signal Vcl goes high, causing a delay circuit 89 formed of a monostable multivibrator to produce a high output, and a 2-input AND gate 90a produces a high output Vrt as shown in FIG. 4. This signal goes through a 2-input OR gate 91 and an amplifier 92 to activate the oil pump 36 in the anti-skid hydraulic system 15 and, at the same time, goes through an amplifier 90b to switch the M/C up-pressure valve 57 to position f so that an oil path for conducting the power steering oil pressure to the submaster cylinder 3 is formed. With another condition that the oil pressure switch 56 is off at a high level added to the above condition, a 3-input AND gate 90c provides an output Vrs, and when the Vrs becomes high, it goes through an amplifier 93 to switch the PS up-pressure valve 58 to position i, whereby the steering gear box 55 is throttled and the power steering hydraulic pressure is conducted to the sub-master cylinder 3. The purpose of entering the output of the oil pressure switch 56 to the 3-input AND gate 90c is to switch the PS up-pressure valve 58 so as to prevent an unnecessary increase in the oil pressure which is raised automatically when the steering wheel is turned during traction control operation. The arrangement also works to supply the oil pressure to the power steering system in precedence over the traction control system.

The 3-position valve 34 in the anti-skid hydraulic system 15 has its three positions a, b and c controlled in response to the state of a transistor Tr1 driven by the output of an amplifier 95 and the state of a transistor Tr2 provided with a current limiting resistor R and driven by the output of another amplifier 96. The valve position is determined by the combination of the transistor outputs as follows.

| Tr1 | Tr2 | Valve position | Brake oil pressure |
| --- | --- | --- | --- |
| OFF | OFF | a | Increase |
| OFF | ON | b | Hold |
| ON | ON | c | Decrease |

The amplifier 96 for driving the transistor Tr2 receives the output Vru of a 3-input AND gate 97, which signal Vru is determined frm the logical sum of the output of a 2-input NAND gate 98 receiving the upper slip threshold signal Vch and first slip control signal Vrgh, the signal Vrt, and the control signal from the anti-skid control circuit (ESC), as shown in FIG. 4. While, the amplifier 95 for driving the transistor Tr1 receives the output signal Vrd of a 2-input OR gate 99, which signal Vrd is determined form the logical sum of the output of a 2-input AND gate 101 receiving the lower slip threshold signal Vcl inverted by an inverter 100 and the second slip control signal Vrgl, and the input signal from the ESC.

As a result of the foregoing arrangement of this embodiment, (A) When the vehicle accelerates as detected on the non-driven wheels 4 and 5, and the power steering oil pressure is high enough, the control operation proceeds as follows:

(1) When the driven wheel speed Vrr has exceeded the lower threshold level Vrl based on the non-driven wheel speed, the oil pump 36 in the anti-skid hydraulic system 15 is activated, and the M/C up-pressure valve 57 and PS up-pressure valve 58 in the power steering hydraulic system 20 are switched to positions f and i, respectively;

(2) If the driven wheel speed Vrr exceeds the upper threshold level Vrh based on the non-driven wheel speed and at the same time the driven wheel acceleration Vrg exceeds a certain reference level G1, the 3-position valve 34 in the anti-skid hydraulic system 15 is set to position a (increase pressure) so as to increase the braking force of the driven wheels 6 and 7;

(3) If the driven wheel speed Vrr is below the lower threshold level Vrl based on the non-driven wheel speed and at the same time the driven wheel acceleration Vrg is below a certain reference level G2 (a negative value), the 3-position valve 34 is set to position c (decrease pressure) so as to reduce the braking force; and (4) On any conditions other than the above (2) and (3), the 3-position valve 34 is set to position b (hold pressure) so as to maintain the braking force. (B) When a steering operation takes place, causing the oil pressure in the steering gear box 55 to increase with the oil pressure switch 56 operating ON, the PS up-pressure valve 58 is restored to position h and the 3-position valve 34 is set to position a (increase pressure). Accordingly, if the driven wheel 6 or 7 slips during the acceleration of the vehicle, the existing anti-skid hydraulic system sourced by the power steering hydraulic pressure is used to brake the driven wheels 6 and 7 so as to prevent a running slip etc., whereby the driven wheels 6 and 7 are exerted to produce optimal traction force. This traction control is easily implemented without the need of specialized hydraulic system and devices, but by utilization of the hydraulic system used for the anti-skid operation, the 3-position valve 34 used therein, and the power steering hydraulic system for obtaining the braking oil pressure independently of the driver's action. On this account, traction control can be established merely through a little modification of the piping and replacement of the electronic control circuit 30 for a vehicle which already installs the anti-skid control and power steering systems. It should be noted in FIG. 3 that the remaining one input to each of the 2-input OR gates 91 and 99 and the 3-input AND gate 97, respectively, is to allow the anti-skid control circuit (ESC) to control the 3-position valve 34 and oil pump 36. Since anti-skid control and traction control do not take place concurrently, these devices can be shared by separate purposes through a simple logical sum process.

Figure 5:
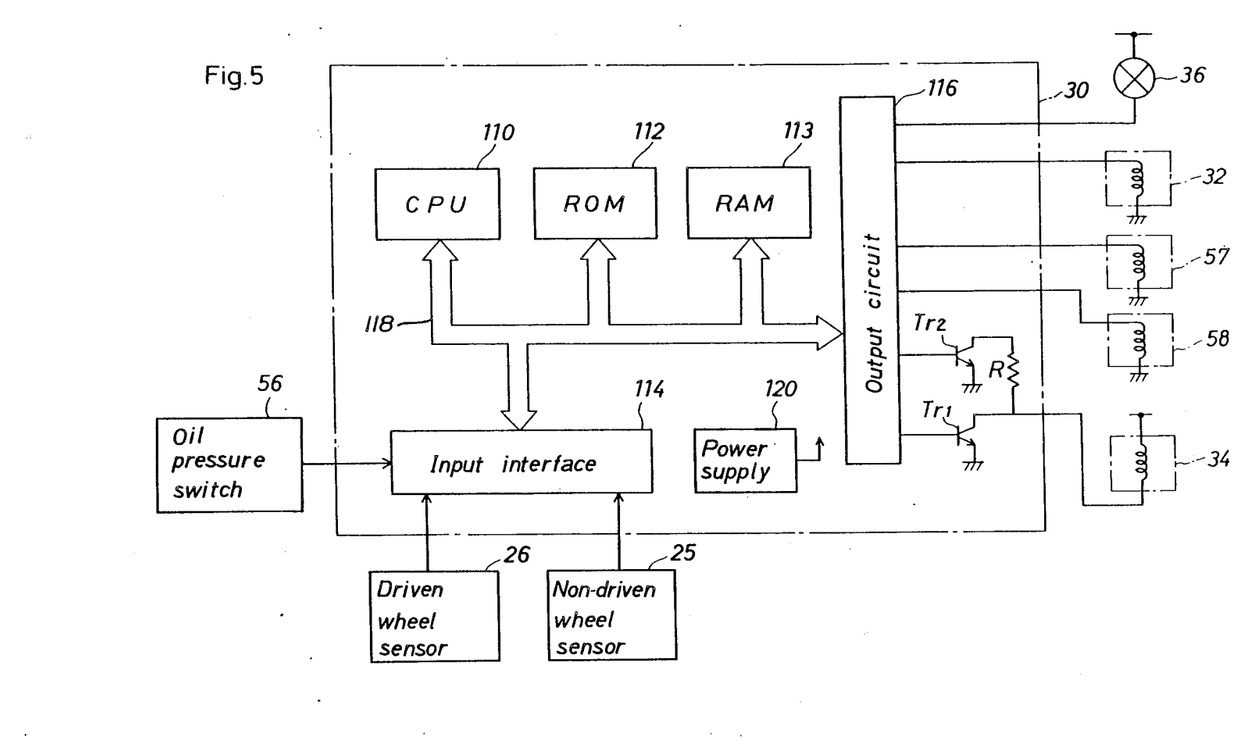
FIG. 5 is a block diagram showing the arrangement of the electronic control circuit 30 in FIG. 1 according to the second embodiment.

Next, the second embodiment of this invention will be described. The second embodiment is intended to control the hydraulic systems and associated devices similar to those of the first embodiment shown in FIG. 2 through an electronic control circuit 30 which is in this case constituted mainly by a microcomputer as shown in FIG. 5. The arrangement of FIG. 5 includes a central processing unit (CPU) 110 which is programmed to receive the sensor signals from the driven wheel speed sensor 26, non-driven wheel speed sensor 25 and oil pressure switch 56, and perform various calculations in response to these input signals. Other circuit components included are a read-only memory (ROM) 112 for storing the above-mentioned CPU control program, maps, and fixed data, a random access memory (RAM) 113 for performing reading and writing sensor input data temporarily, and calculation data, an input interface circuit 114 including waveform shaping circuits and a multiplexer for supplying sensor input signals selectively to the CPU 110, an output circuit 116 for driving the oil pump 36, change valve 32, M/C up-pressure valve 57, PS up-pressure valve 58, and the 3-position valve 34 through transistors Tr1 and Tr2, a bus line 118 for providing data communication between the CPU 110, ROM 112, RAM 113, and input/output interface circuits 114 and 116, and a power supply circuit 120 for all of the above circuit components.

The traction control operation which is carried out together with anti-skid control on a time division basis by the electronic control circuit 30 arranged as described above will be described in connection with the flowchart shown in FIG. 6.

Step 200: Read input data on the input interface circuit 114 of the driven wheel speed vr from the driven wheel sensor 26, the non-driven wheel speed vf from the non-driven wheel sensor 25, and the switch state from the oil pressure switch 56.

Step 220: Perform differentiation process for the driven wheel speed vr to obtain acceleration of the driven wheels.

Step 230: Test whether the driven wheel acceleration $\alpha$ is greater than or equal to zero (acceleration).

Step 240: Calculate the slip threshold levels vs1 and vs2 from the non-driven wheel speed vf using predetermined constants K1, K2 (K2>K1), g1 and g2, as follows.

$$vs1 = K1 \times vf + g1$$

$$vs2 = K2 \times vf + g2$$

Step 250: Test whether the driven wheel speed vr is higher than the first threshold level vs1.

Step 260: Set a predetermined value to the counter C in the CPU.

Step 270: Reset the counter C to zero.

Step 280: Decrement the counter C by one.

Step 290: Test whether the content of counter C is greater than zero.

The counter C used in the steps 260–290 is actually a programmed operation substituting for the delay circuit 89 in the first embodiment, and its purpose is to continue traction control for a preset time length when the speed vr has fallen below the first threshold level vs1 after traction control has been commenced.

Step 293: Test whether the oil pressure switch 56 is OFF. If the switch is OFF, indicating the steering operation being inert and the power steering hydraulic pressure not being increased, the sequence proceeds to step 350.

Step 296: If the oil pressure switch 56 is found ON in step 293, indicating the steering operation, the PS up-pressure valve 58 is reset to position h.

Step 300: Set or hold the M/C up-pressure valve 57 in the power steering hydraulic system 20 to position f, and activate the oil pump 36.

Step 303: Test whether the oil switch 56 is OFF.

Step 306: If the oil pressure switch 56 is OFF, switch the PS up-pressure valve 58 to position i so as to increase the oil pressure conducted to the submaster cylinder 3.

Step 309: if the oil pressure switch 56 is ON, switch the PS up-pressure valve 58 to position h.

Step 310: Test whether the driven wheel speed vr is higher than the second threshold level vs2.

Step 320: Reset or hold the M/C up-pressure valve 57 and PS up-pressure valve 58 to positions e and h, respectively, and deactivate the oil pump 36.

Step 330: Set or hold the 3-position valve 34 in the anti-skid hydraulic system 15 to position a (increase pressure).

Step 340: Set the 3-position valve 34 to position b (hold pressure).

Step 350: Set the 3-position valve 34 to position c (decrease pressure).

Figure 7:
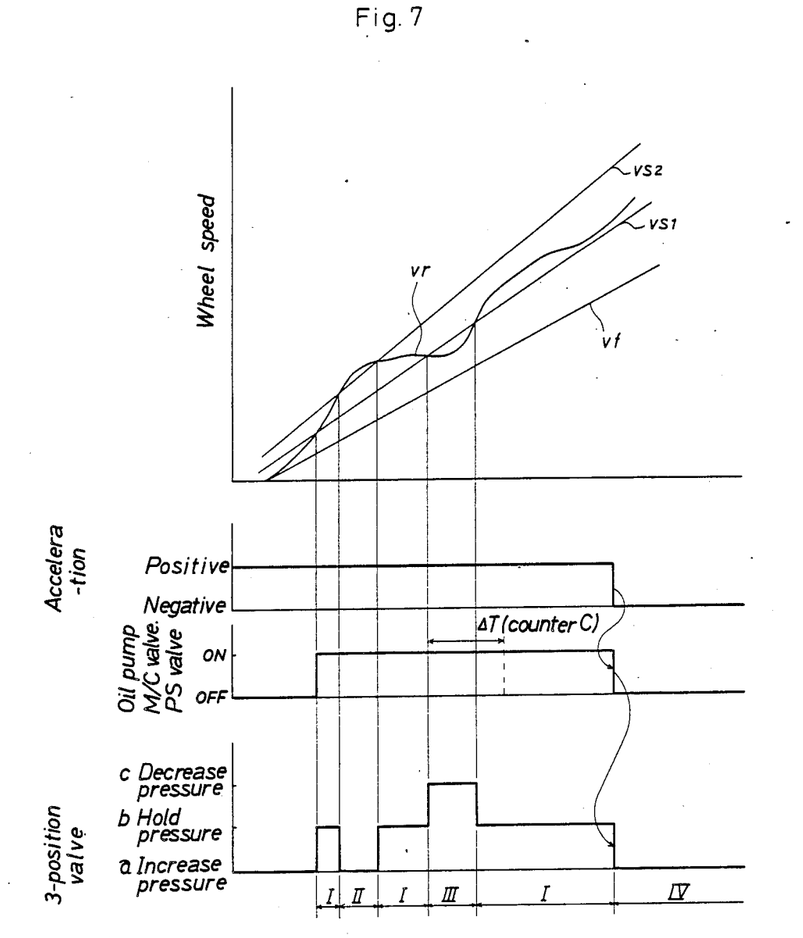
FIG. 7 is a timing chart showing, as an example, the control operation of the second embodiment.

According to this embodiment, as shown in FIG. 7: (A) When the driven wheels 6 and 7 are found accelerating ($\alpha = 0$), i.e., an affirmative decision having been made by step 230, the control operation takes place as follows:

(1) When the driven wheel speed vr has exceeded the first threshold level vs1 which is based on the non-driven wheel speed vf, i.e., an affirmative decision having been made by step 250, the oil pump 36 in the anti-skid hydraulic system 15 is activated, the M/C up-pressure valve 57 in the power steering hydraulic system 20 is set to position f, and the 3-position valve 34 in the anti-skid hydraulic system 15 is set to position b (hold pressure). (See period I in FIG. 7.)

In the above operation, if the oil pressure switch 56 is OFF, the PS up-pressure valve 58 is set to position i (steps 303 and 306), or if the oil pressure switch 56 is ON, the PS up-pressure valve 58 is set to position h (steps 303 and 309).

(2) When the driven wheel speed vr has exceeded the second threshold level vs2, i.e., an affirmative decision having been made by step 310, the 3-position valve 34 is set to position a (increase pressure) so as to increase the braking force of the driven wheels. (See period II in FIG. 7.)

(3) Following the above state (1) or (2), when the driven wheel speed vr has fallen below the first threshold level vs1, i.e., a negative decision having been made by step 250 and an affirmative decision having been made by step 290, the 3-position valve 34 is set to position c (decrease pressure) so as to reduce the braking force. (See period III in FIG. 7.) At this time, if the oil pressure switch 56 is found ON, the PS up-pressure valve 58 is reset to position h (steps 293 and 296).

(4) When the time length set in the counter C has expired (a negative decision having been made by step 290), while the driven wheel speed vr stays below the first threshold level vs1, the M/C up-pressure valve 57 and PS up-pressure valve 58 are set to positions e and h, respectively, the oil pump 36 is deactivated, and the 3-position valve 34 is switched to position a (increase pressure) to complete the traction control operation (the period not shown in FIG. 7.). (B) If the vehicle acceleration α falls below zero, i.e., deceleration begins (a negative decision having been made by step 230), the counter C is reset to zero, and the same control as above (4) takes place. (See period IV in FIG. 7)

This embodiment performs identically to the first embodiment, and moreover, the use of the CPU 110 allows various schemes of traction control without changing the hardware structure of the electronic control circuit 30.

Next, the third embodiment of the invention will be described. This embodiment features to detection of the differential pressure between the first and second pressure sources and allows the control means to select a brake pressure source depending on the detection result so that more stable traction control can take place through the provision of a hysteresis or priority rule in selecting a pressure source.

Figure 8:
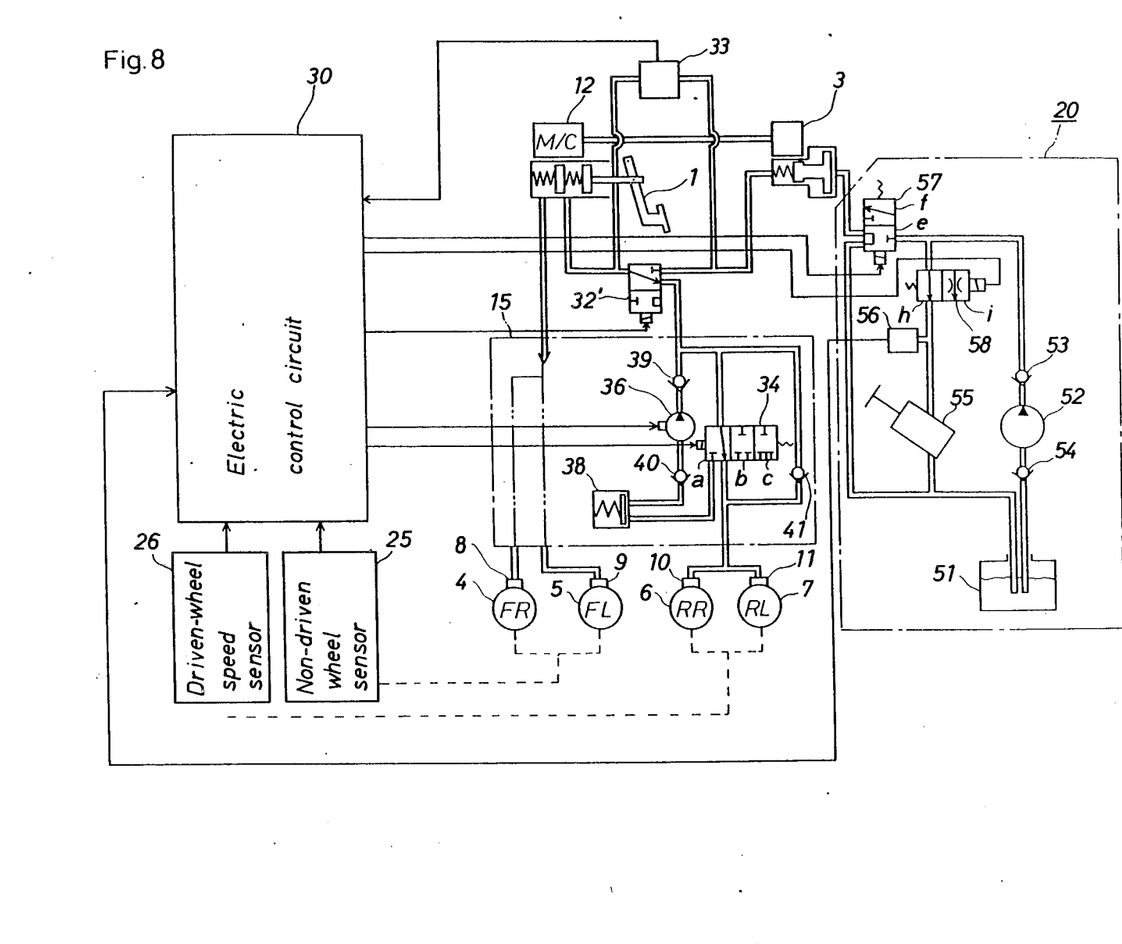
FIG. 8 is a schematic block diagram mainly showing the wheel slip control system according to the third embodiment

The arrangement of the third embodiment will be described in connection with FIG. 8, with portions identical to parts of the first and second embodiments being disregarded in the following description. The new arrangement employs a 3-port, 2-position electromagnetic valve 32' of a spring offset type (termed simply "switch valve" hereinafter) as a pressure source selection means in place of the change valve 32' used in the previous embodiment. The switch valve 32 operates in response to the command of the electronic control, circuit 30 to conduct the higher of the two pressure sources to the anti-skid hydraulic system 15. A differential pressure switch 33 is provided for the electronic control circuit 30 to compare the pressure of two hydraulic sources, and the switch 33 produces an ON signal to operate the switch valve 32' when the pressure of the brake master cylinder 2 is higher than the submaster cylinder 3.

Figure 9:
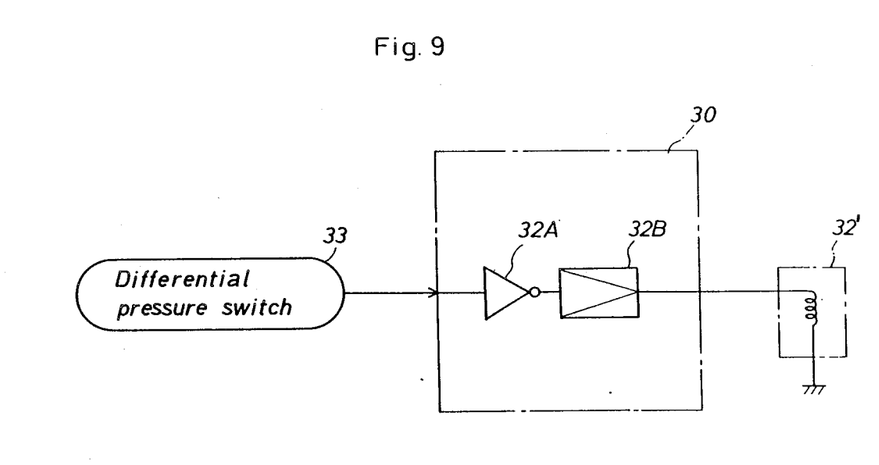
FIG. 9 is a schematic block diagram of the electronic circuit for implementing the hydraulic pressure source selection according to the third embodiment.

FIG. 9 shows the circuit diagram of the electronic control circuit 30 for implementing, the switching operation of the switch valve 32'. The arrangement includes an inverter 32a, which receives and inverts the output signal from the differential pressure switch 33 and delivers the inverted output to an amplifier 32b by which output the solenoid of the switch valve 32' is energized. Accordingly, during the normal running condition in which the hydraulic pressure of the sub-master cylinder 3 is discharged to the drain 51, the pressure of the brake master cylinder 2 is added to the anti-skid hydraulic system 15 so that the driver's action is reflected on a first priority basis. During the aforementioned traction control, the driver does not normally take a braking action, and the submaster cylinder 3 receiving pressure from the power steering hydraulic system 20 has an increased oil pressure to activate the switch valve 32', thereby conducting its pressure to the anti-skid hydraulic system 15. In case the driver takes a braking action during the traction control, an increased pressure in the brake master cylinder 2 as detected by the differential pressure switch 33 causes the Cswitch valve 32' to be deenergized, whereby the driver's will is reflected on the operation on a first priority basis and at the same time the feeling of depressing the brake pedal 1 is not affected.

Figure 10:
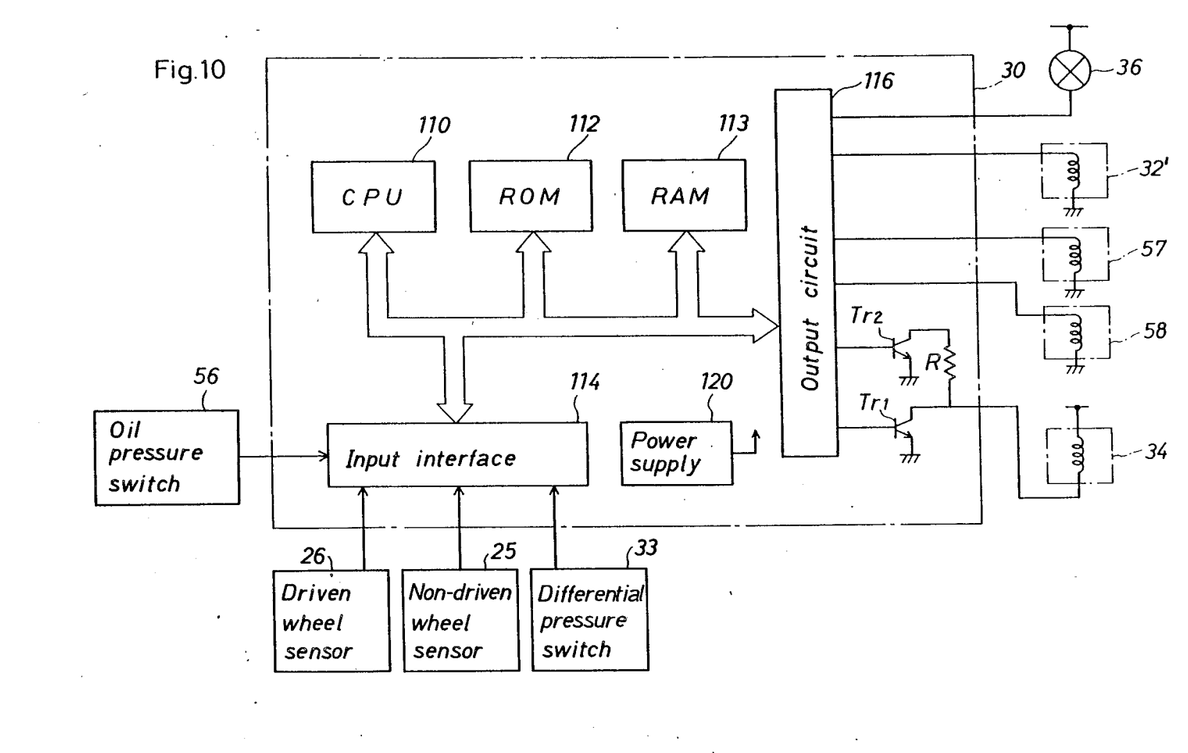
FIG. 10 is a block diagram showing the electronic control circuit 30 according to the fourth embodiment.

FIG. 10 shows the fourth embodiment of this invention, in which the differential pressure switch 33 sends its output to the electronic control circuit 30. The control operation will be described with reference to FIG. 11.

Figure 6:
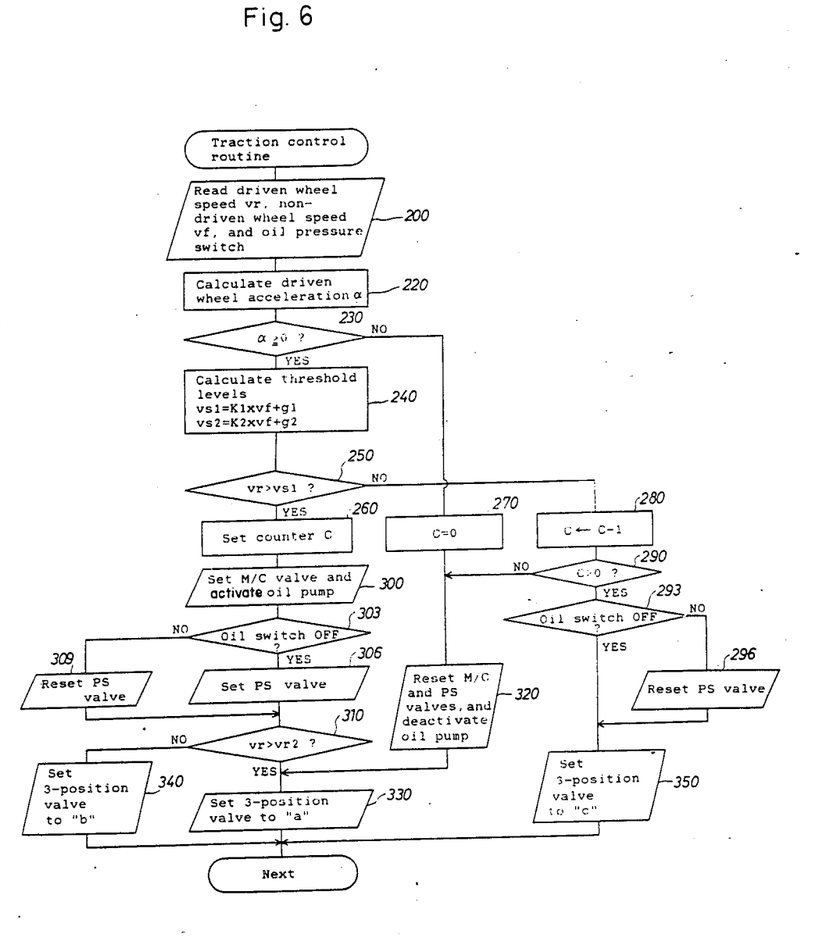
FIG. 6 is a flowchart showing, as an example, the control operation of the second embodiment.
Figure 11:
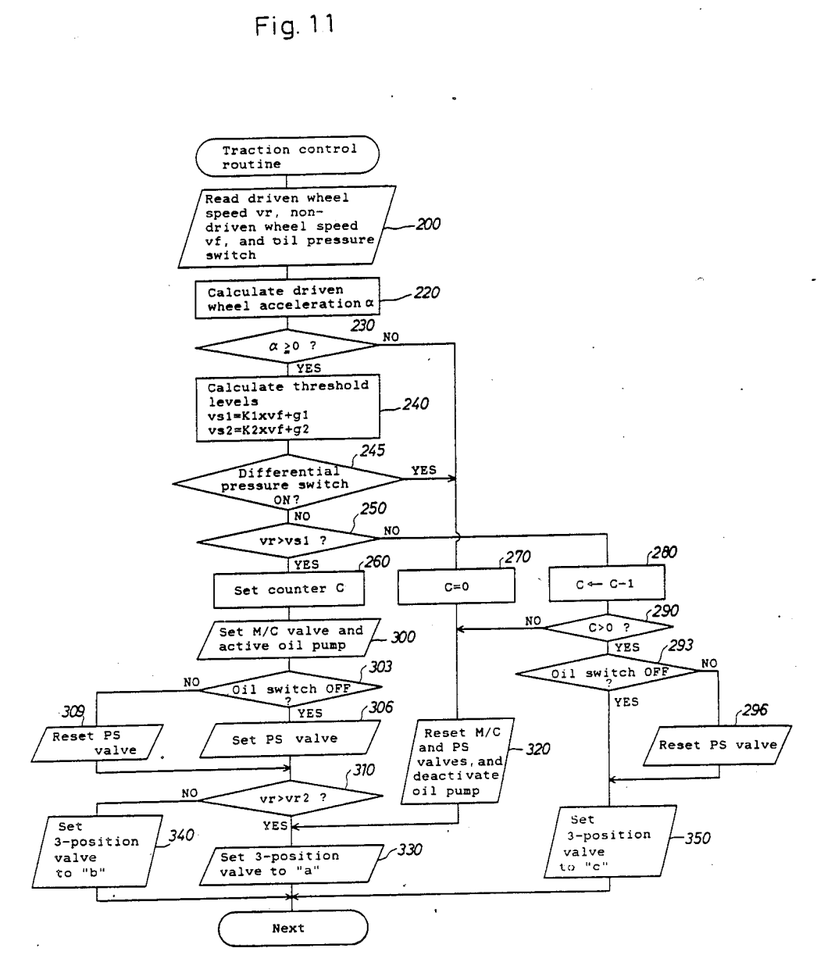
FIG. 11 is a flowchart showing, as an example, the control operation of the fourth embodiment.

The flowchart of FIG. 11 differs from that of the second embodiment shown in FIG. 6 in the addition of step 245. The step 245 tests the state of the differential pressure switch 33. When the driver does not take a braking action and thus the brake master cylinder 2 has a low pressure, the sequence responds to a negative decision of step 245 to proceed to step 250. If the step 250 makes an affirmative decision, the sequence proceeds to step 270 in which the counter C is reset to zero as in the case of the previous embodiment.

The third and fourth embodiments are designed to detect the difference between the brake oil pressure produced by the driver's braking action and the brake oil pressure produced by another pressure source installed on the vehicle, and conduct one of them selectively to the braking device in accordance with the result of detection. This scheme allows the driver to have priority in taking a braking action, and the traction control is accomplished without impairing the feeling of operating the brake pedal.

By making the control means for selecting a brake oil pressure source responsive to the change in the differential pressure of the two sources through the provision of a hysteresis or priority rule, for example, a more sophisticated traction control can be realized.

What is claimed is:
1. A wheel slip control system comprising:
brake slip detection means for providing brake slip signals representative of a slip condition of a driven wheel during braking of a vehicle;

acceleration slip detection means for providing acceleration slip signals representative of a slip condition of said driven wheel during acceleration of said vehicle;

a first pressure source for producing a first pressure;

a second pressure source for producing a second pressure;

pressure control means responsive to said acceleration of said vehicle for controlling said seocnd pressure of said second pressure source;

pressure source selection means for receiving said first and second pressures and for outputting selectively one of said first and second pressures, depending upon a measured differential therebetween;

control means responsive to said brake slip signals and said acceleration slip signals for providing anti-skid control signals and traction control signals; and hydraulic actuator means for receiving said selectively outputted first and second pressures from said pressure source selection means for use as a hydraulic braking pressure, and for responding to said anti-skid control signals and said traction control signals to control a speed of said driven wheel within a predetermined range, thereby preventing said driven wheel from slipping.

2. The wheel slip control system according to claim 1, wherein said pressure control means includes means responsive to said acceleration of said vehicle for controlling said second pressure source to increase said second pressure.

3. The wheel slip control system according to claim 1, wherein said acceleration slip signals are functions of a driven wheel speed.

4. The wheel slip control system according to claim 1, wherein said acceleration slip signals are functions of a driven wheel acceleration.

5. The wheel slip cntrol system according to claim 1, wherein said second pressure source includes a power steering control pressure system, a change valve for controlling a pressure generated therein, and a submaster cylinder for supplying a pressure therefrom to said pressure source selection means.

6. The wheel slip control system according to claim 1, wherein said pressure source selection means is a change valve responsive to said differential between said first and said second pressures for outputting a higher of the first and second pressures to said hydraulic actuator means.

7. The wheel slip control system according to claim 1, wherein said control means controls said hydraulic actuator means to decrease said hydraulic braking pressure when said driven wheel speed falls below a lower limit of said predetermined range, to increase said hydraulic braking pressure when said driven wheel speed rises above an upper limit of said predetermined range, and to otherwise hold said hydraulic braking pressure constant.

8. A wheel slip control system comprising:

brake slip detection means for providing brake slip signals representative of a slip condition of a driven wheel during braking of a vehicle;

accelerator slip detection means for providing acceleration slip signals representative of a slip condition of said driven wheel during acceleration of said vehicle;

a first pressure source for producing a first pressure;

a second pressure source for producing a second pressure;

pressure control means respnsive to said acceleration of said vehicle for controlling said second pressure of said second pressure source;

pressure source selection means for receiving said first and second pressures and for outputting selectively one of said first and second pressures, depending upon a measured differential therebetween;

control means responsive to said brake slip signals and said acceleration slip signals for providing anti-skid control signals and traction control signals; and hydraulic actuator means for receiving said selectively outputted first and second pressures from said pressure source selection means for use as a hydraulic braking pressure and to responding to said anti-skid control signals and said traction control signals to control a speed of said driven wheel within a predetermined range, thereby preventing said driven wheel from slipping;

wherein said pressure source selection means includes differential pressure detection means for providing a pressure signal representative of said first pressure being higher than said second pressure or said second pressure being higher that said first pressure, and a change valve means responsive to said pressure signal for supplying a higher of said first and second pressures to said hydraulic actuator means.

9. The wheel slip control system according to claim 8, wherein said pressure control means includes means responsive to said acceleration of said vehicle for controlling said second pressure source to increase said second pressure.

* * * * *